US010816663B2

(12) United States Patent
Ota et al.

(10) Patent No.: US 10,816,663 B2
(45) Date of Patent: Oct. 27, 2020

(54) DISTANCE MEASURING DEVICE AND DISTANCE MEASURING METHOD

(71) Applicant: KABUSHIKI KAISHA TOSHIBA, Tokyo (JP)

(72) Inventors: Yutaka Ota, Yokohama Kanagawa (JP); Masatoshi Hirono, Yokohama Kanagawa (JP); Mineharu Uchiyama, Kawasaki Kanagawa (JP); Nobu Matsumoto, Ebina Kanagawa (JP); Hiroshi Kubota, Fussa Tokyo (JP); Shinichi Ohtsuka, Saitama Saitama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 320 days.

(21) Appl. No.: 15/694,961

(22) Filed: Sep. 4, 2017

(65) Prior Publication Data
US 2018/0128918 A1 May 10, 2018

(30) Foreign Application Priority Data

Nov. 8, 2016 (JP) ................................. 2016-218117

(51) Int. Cl.
G01S 17/08 (2006.01)
G01S 7/481 (2006.01)
(Continued)

(52) U.S. Cl.
CPC ............ *G01S 17/08* (2013.01); *G01S 7/4814* (2013.01); *G01S 7/4816* (2013.01); *G01S 17/42* (2013.01); *G01S 17/89* (2013.01)

(58) Field of Classification Search
None
See application file for complete search history.

(56) References Cited

U.S. PATENT DOCUMENTS 8,996,172 B2 3/2015 Shah et al.
10,048,376 B2 8/2018 Kubota
(Continued)

FOREIGN PATENT DOCUMENTS

JP S616782 U 1/1986
JP 2001004746 A 1/2001
(Continued)

OTHER PUBLICATIONS

Japanese Office Action dated Aug. 13, 2019, mailed in counterpart Japanese Application No. 2016-218117, 13 pages (with translation).
(Continued)

*Primary Examiner* — Yuqing Xiao
*Assistant Examiner* — Amir J Askarian
(74) *Attorney, Agent, or Firm* — Kim & Stewart LLP

(57) ABSTRACT

A distance measuring device includes a laser light source, an irradiation optical system comprising a beam spreader which is configured to spread the laser light about a first optical axis, a light reception optical system having a second optical axis different from the first optical axis and positioned to receive reflected light of the laser light from the object for measuring a distance to the object, a sensor with light receiving elements arranged in a first direction, the sensor being positioned to receive light reflected from the object which has passed through the light reception optical system, and a distance measuring unit configured to acquire distance information relating to the object based on the difference in time between emission of the laser light source and the reception of the reflected light at each of the plurality of light receiving elements.

10 Claims, 8 Drawing Sheets

(51) Int. Cl.
*G01S 17/89* (2020.01)
*G01S 17/42* (2006.01)

(56) References Cited

U.S. PATENT DOCUMENTS

| | | | | |
|---|---|---|---|---|
| 2013/0229645 | A1* | 9/2013 | Suzuki | G01S 17/02 356/5.01 |
| 2014/0071428 | A1* | 3/2014 | Suzuki | G01C 3/08 356/4.01 |
| 2014/0300887 | A1* | 10/2014 | Yamamoto | G01S 17/08 356/5.01 |
| 2015/0124238 | A1* | 5/2015 | Sakai | G01S 17/026 356/4.01 |
| 2015/0168541 | A1* | 6/2015 | Lee | G01C 3/06 702/159 |
| 2016/0266253 | A1* | 9/2016 | Kubota | G01S 17/105 |
| 2017/0102461 | A1* | 4/2017 | Tezuka | G01S 7/4911 |
| 2017/0212229 | A1* | 7/2017 | Pennecot | G01S 7/4972 |
| 2018/0106901 | A1* | 4/2018 | Frederiksen | G01S 17/88 |
| 2018/0107221 | A1* | 4/2018 | Droz | G05D 1/024 |
| 2018/0143309 | A1* | 5/2018 | Pennecot | G01S 7/4972 |

FOREIGN PATENT DOCUMENTS

| | | |
|---|---|---|
| JP | 2010534825 A | 11/2010 |
| JP | 2010271306 A | 12/2010 |
| JP | 2013083624 A | 5/2013 |
| JP | 2014081254 A | 5/2014 |
| JP | 2015132600 A | 7/2015 |
| JP | 2016170114 A | 9/2016 |

OTHER PUBLICATIONS

Japanese Office Action dated Dec. 13, 2019, mailed in counterpart Japanese Application No. 2016-218117, 8 pages (with translation).

* cited by examiner (SIDE VIEW) (TOP VIEW)

DISTANCE MEASURING DEVICE AND DISTANCE MEASURING METHOD

CROSS-REFERENCE TO RELATED APPLICATION

This application is based upon and claims the benefit of priority from Japanese Patent Application No. 2016-218117, filed Nov. 8, 2016, the entire contents of which are incorporated herein by reference.

FIELD

Embodiments described herein relate generally to a distance measuring device and a distance measuring method.

BACKGROUND

A distance measuring device is known that irradiates an object at a distance to be measured with laser light through an irradiation optical system and then receives light reflected from the object through a light reception optical system. The round-trip time of the light increases as the distance, that is, the optical path length, from the distance measuring device to the object being measured becomes longer. Thus, the distance can be measured by using a difference in time between one point in time of irradiation from the laser light and a point in time for the detection of the corresponding reflected light.

In such a distance measuring device using laser light, generally, an optical axis of the irradiation optical system is configured coaxially with an optical axis of the light reception optical system in order to match an irradiation range and a light reception range. Thus, in these optical systems, a distance to one point on the measured object is measured during each irradiation with the laser light. In addition, progress is being made to reduce the size of the distance measuring device.

Measuring distances to a plurality of points on the measured object requires an optical member such as a reflective mirror that changes the optical path of the laser light, thereby leading to a possibility of impeding reduction of the size of the distance measuring device.

DETAILED DESCRIPTION

Embodiments provide a distance measuring device that enables measurement of distances to a plurality of points at once using laser light.

In general, according to one embodiment, a distance measuring system includes a laser light source configured to emit laser light, an irradiation optical system comprising a beam spreader which is configured to spread the laser light emitted from the laser light about a first optical axis in a first direction, the first optical axis intersecting an object the distance to which is to be measured, a light reception optical system having a second optical axis that is different than the first optical axis, the light reception optical system positioned to receive reflected light of the laser light directed toward the object the distance to which is to be measured, a sensor including a plurality of light receiving elements arranged in the first direction, the sensor positioned to receive light reflected from the object the distance to which is to be measured which has passed through the light reception optical system, and a distance measuring unit configured to acquire distance information relating to the object the distance to which is to measured based on the difference in time between emission of the laser light source and the reception of the reflected light at each of the plurality of light receiving elements.

Hereinafter, exemplary embodiments will be described with reference to the drawings.

First Embodiment

A distance measuring device according to the present embodiment measures the distance to a plurality of points on a measured object at once using an irradiation optical system that irradiates multiple locations on the measured object with laser light, by spreading the laser light in a first direction. The distance measuring device will be more specifically described below.

First Embodiment

Figure 1A:
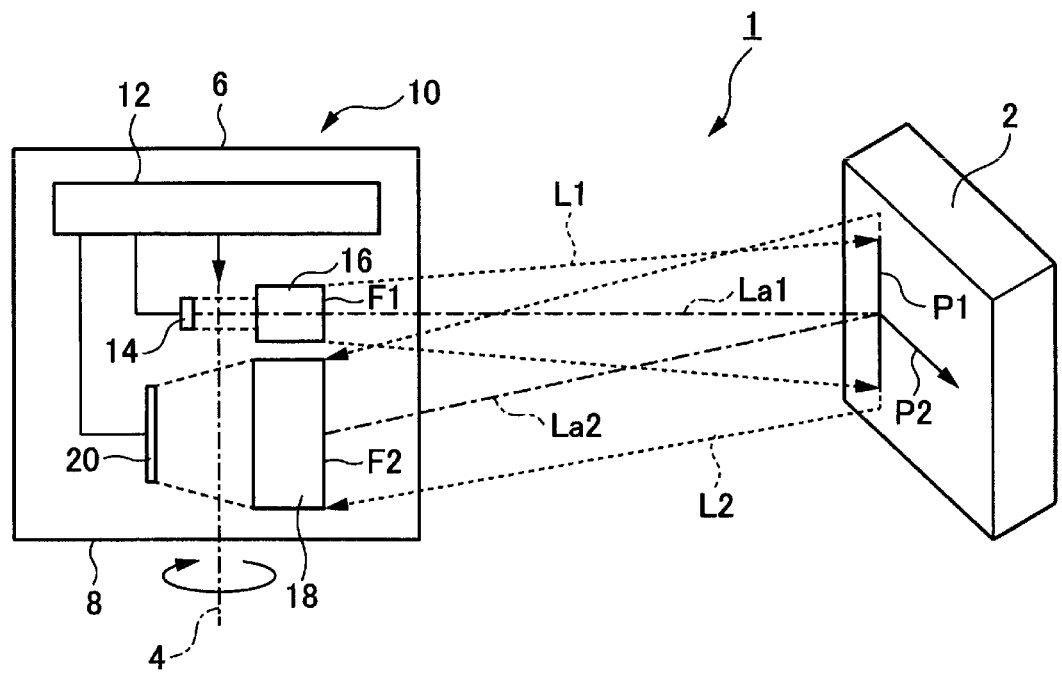
FIG. 1A is a diagram illustrating a schematic configuration of a distance measuring device according to a first embodiment.
Figure 1B:
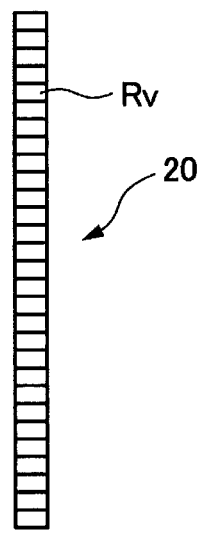
FIG. 1B is a diagram illustrating a schematic configuration of a sensor according to the first embodiment.

FIG. 1A is a diagram illustrating a schematic configuration of a distance measuring device 1 according to a first embodiment, and FIG. 1B is a diagram illustrating a schematic configuration of a sensor 20 according to the first embodiment.

The distance measuring device 1 generates a distance image including a measured object 2 by determining the time of flight (TOF) of light emitted from the laser thereof which irradiates the object to be measured and is returned to a detector in the measuring device 1. Specifically, the distance measuring device 1 intermittently irradiates the measured object 2 with laser light and measures the distances to a plurality of points on the measured object 2 based on the time from emission of the laser light by the laser until detection of the laser light reflected from the surface of the measured object 2 (hereinafter, referred to as reflected light). The reflected light may be referred to as scattered reflected light.

The distance measuring device 1 includes a distance measuring unit 12, a laser light source 14, an irradiation optical system 16, a light reception optical system 18, and the sensor 20. The distance measuring device 1 is disposed in, for example, a casing 10. The casing 10 rotates about a rotation axis 4. The casing 10 is formed in, for example, a cylindrical shape, and the rotation axis 4 is a line segment connecting a central point of an upper surface 6 and a central point of a lower surface 8 of the cylindrical casing 10. The laser light source 14, the irradiation optical system 16, the light reception optical system 18, and the sensor 20 rotate about the rotation axis 4. An irradiation region P1 on the measured object 2 irradiated with the laser light is thus a line which moves in the direction P2 (horizontal direction). The diameter of the casing 10 is, for example, approximately 10 cm. The casing 10 need not have a cylindrical shape and may be formed in various shapes.

The distance measuring unit 12 controls the laser light source 14 and the sensor 20 and performs a measurement process that acquires the distances to a plurality of points on the measured object 2.

The laser light source 14 intermittently emits laser light in accordance with a pulse signal input from the distance measuring unit 12. The laser light source 14 is, for example, a surface-emitting laser and it emits laser light at predetermined intervals. This laser light has high directivity in the traveling direction thereof and thus travels in a state where the irradiation width is maintained if the width of the light is not changed by an optical member. The laser light source 14 outputs weak laser light in order to increase, for example, safety.

The irradiation optical system 16 has an optical axis La1 and it spreads out the laser light from the laser light source 14 in a vertical direction that is orthogonal to the optical axis La1. For example, the irradiation optical system 16 is configured with a plurality of lenses including a cylindrical lens. The optical axis La1 is orthogonal to, for example, the rotation axis 4 of the casing 10. That is, the irradiation optical system 16 performs irradiation of the object by spreading the beam of laser light from the laser light source 14 in a first direction that is parallel to the rotation axis 4. In the present embodiment, the region of the object 2 irradiated with the laser light is denoted by P1. The irradiation region P1 is a one-dimensional region that is long in the vertical direction orthogonal to the optical axis La1.

The light reflected from the measured object 2 in a light reception range L2 is received at the sensor 20 of the light reception optical system 18. The light reception range L2 is a distance range over which the light reception optical system 18 can detect reflected light at the sensor 20. The light reception optical system 18 has an optical axis La2 that is different from the optical axis La1 of the irradiation optical system 16. The light reception optical system 18 is configured with, for example, a plurality of lenses. Each of the irradiation optical system 16 and the light reception optical system 18 may be configured with a single lens. An angle of view represents the spread of the light reception range L2 as an angle. As the distance from the distance measuring device 1 is increased the angle of view becomes larger, and the light reception range L2 is widened.

In the present embodiment, the angle of view in the first direction is set in such a manner that the overlap between the irradiation range L1 and the light reception range L2 is increased. The directivity of the laser light makes the width of the laser light greater in the vertical direction than in the horizontal direction in a position that is separated at a predetermined distance from the irradiation surface F1 of the irradiation optical system 16. Thus, the angle of view in the first direction is configured to be greater than the angle of view in a second direction that is orthogonal to the first direction. Accordingly, even if the optical axis La1 of the irradiation optical system 16 and the optical axis La2 of the light reception optical system 18 are not coaxial with each other, most of the reflected light of the laser light from the irradiation optical system 16 will be received by the light reception optical system 18.

In a case where, for example, the distance to the to be measured object 2 is limited, the angle of view of the light reception optical system 18 may be increased to be greater than the angle of view of the irradiation optical system 16 so that the light reception range L2 covers the irradiation range P1 on the measured object 2. Alternatively, the direction of any of the optical axis La1 of the irradiation optical system 16 and the optical axis La2 of the light reception optical system 18 may be adjusted in such a manner that the light reception range La2 covers the irradiation range P1 on the measured object 2.

An optical system in the related art in which the optical axis La1 of the irradiation optical system 16 and the optical axis La2 of the light reception optical system 18 are coaxial with each other generally uses an optical member such as a mirror with a through aperture therein or a dichroic mirror to change an optical path of the reflected light back toward the sensor 20. Meanwhile, the light reception optical system 18 of the present embodiment has an optical axis La2 which is different from the optical axis La1 of the irradiation optical system 16. Thus, an optical member such as a mirror with a through aperture or a dichroic mirror is not required, and the light reception optical system 18 can be more simply configured.

The sensor 20 has a plurality of light receiving elements that can detect photons. Each light receiving element is, for example, a photodiode and it outputs electric signals in response to photons that reach the light reception regions Rv. The electric signals of each light receiving element are input into the distance measuring unit 12.

As illustrated in FIG. 1B, the light reception regions Rv of each light receiving element are arranged in a line that is parallel to the rotation axis 4. The light reception optical system 18 is configured in such a manner that the reflected light is received in the light reception regions Rv arranged in a line. Therefore, the reflected light is condensed in a one-dimensional shape at the sensor 20 through the light reception optical system 18. Accordingly, distance information as to a plurality of positions on the object in the region P1 can be acquired by emission of one pulse by the laser light source 14.

Figure 2:
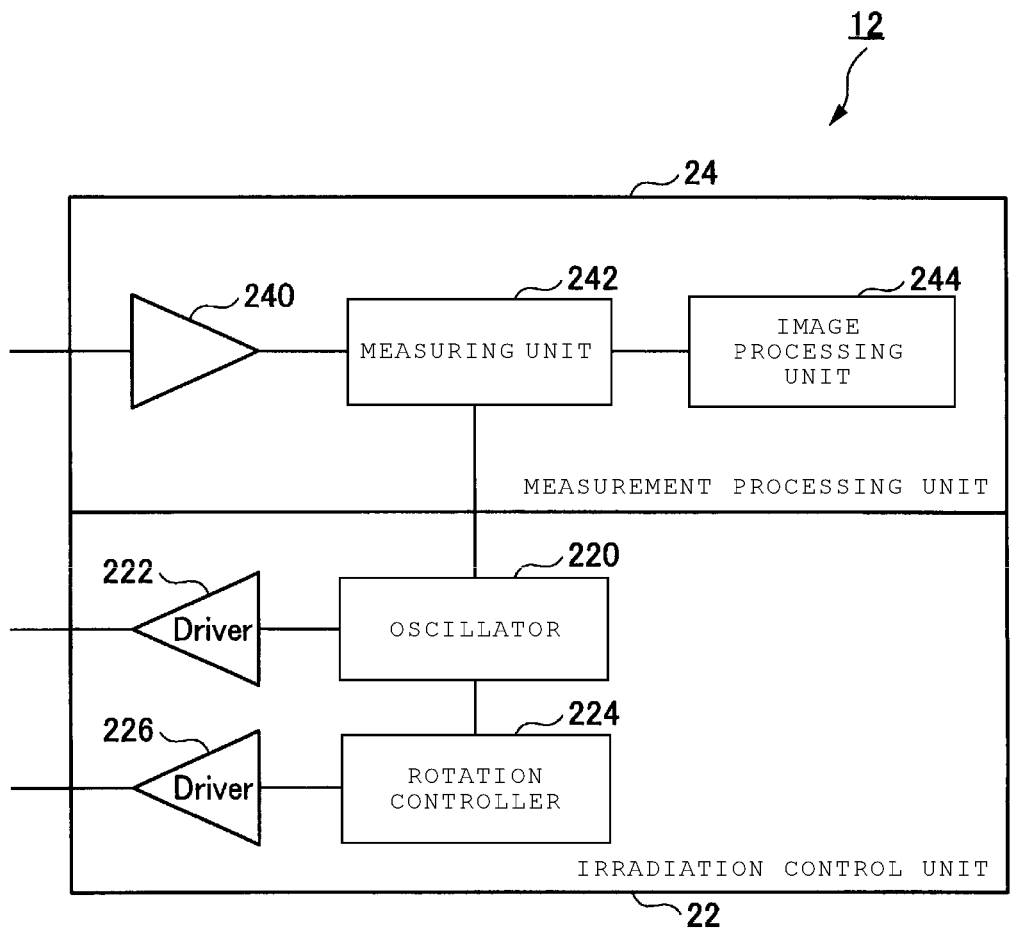
FIG. 2 is a block diagram of a distance measuring unit.

Next, a detailed configuration of the distance measuring unit 12 will be described. FIG. 2 is a block diagram of the distance measuring unit 12. The distance measuring unit 12 is, for example, a circuit that includes an irradiation control unit 22 and a measurement processing unit 24.

The irradiation control unit 22, is for example, a controller circuit that controls rotation of the laser light source 14, the irradiation optical system 16, the light reception optical system 18, the sensor 20 and the emission of light from the laser light source 14. The irradiation control unit 22 has an oscillator 220, a rotation controller 224, and drive circuits 222 and 226. The oscillator 220 generates a pulse signal. The drive circuit 222 drives the laser output of the laser light source 14 based on the pulse signal. The rotation controller 224 generates a rotation signal to rotate the casing 10. The drive circuit 226 drives a rotation motor, not illustrated, based on the rotation signal to rotate the casing 10 and thus the laser light source 14 and the components therein about the rotation axis 4. In the present embodiment, the rotation controller 224 corresponds to a rotation unit.

Accordingly, the irradiation control unit 22 continuously or sequentially moves the position of the laser light irradiating the object 2 in the horizontal direction P2 (FIGS. 1A and 1B), by rotating the laser light source 14 about the rotation axis 4. Thus, a reflective mirror or the like that mechanically changes the direction of the laser light to scan the light across an object is not required in the optical path of the laser light, and thus the optical system has a simpler configuration. In addition, distance information along a 360 degrees arc can be acquired by rotating the laser light source 14 and the like about the rotation axis 4. In this case, since the direction in which the irradiation optical system 16 spreads out the laser light is parallel to the direction of the rotation axis 4, the directivity of the laser light in the direction P2 with respect to the traveling direction thereof is substantially maintained.

The measurement processing unit 24 is, for example, a processing circuit that performs a process of measuring the distances to the plurality of points in the measured object 2. The measurement processing unit 24 includes an amplifier 240, a measuring unit 242 (e.g., a processor), and an image processing unit 244 (e.g., a processor). The amplifier 240 amplifies the electric signals from the sensor 20 and outputs the amplified electric signals to the measuring unit 242. The measuring unit 242 receives the output signals of the amplifier 240 and determines the distance from the light emission surface F1 of the irradiation optical system 16 to the measured object 2 based on the signals of each of the plurality of light receiving elements and the timing of a light pulse from the laser light source 14 in relation to when reflected light of that pulse is received at the light receiving elements. Specifically, the measuring unit 242 determines the distances to the plurality of points on the being measured object 2 based on the difference in time between the point in time of the emission of the laser light source 14 and the point in time of the reception of the reflected light at the sensor 20. The determined, and thus measured, distances increase as the difference in time becomes greater. In addition, the measuring unit 242 outputs, to the image processing unit 244, distance information as one-dimensional distance data that corresponds to each of the plurality of light receiving elements in the sensor 20.

The image processing unit 244 performs, for example, noise reduction, distortion correction, and an interpolation process for each one-dimensional distance image data point acquired in different irradiation positions to generate a two-dimensional distance image data. While the measurement processing unit 24 is arranged in an upper portion in the casing 10 in the present embodiment, the measurement processing unit 24 may be arranged in a lower portion or the like of the distance measuring device 1. For example, the measurement processing unit 24 may be arranged to be in contact with the lower surface 8 of the casing 10. Alternatively, the measurement processing unit 24 may be arranged outside of the casing 10.

An example of arrangement of the irradiation optical system 16 and the light reception optical system 18 and the angle of view will be described in detail based on FIGS. 3A to 5D. In FIGS. 3A to 5D, for clarification purposes, angles of view FOH1 and FOH2 and FOV1 and FOV2 are depicted as having greater than the actual angles of view FOH1 and FOH2 and FOV1 and FOV2.

Figure 3A:
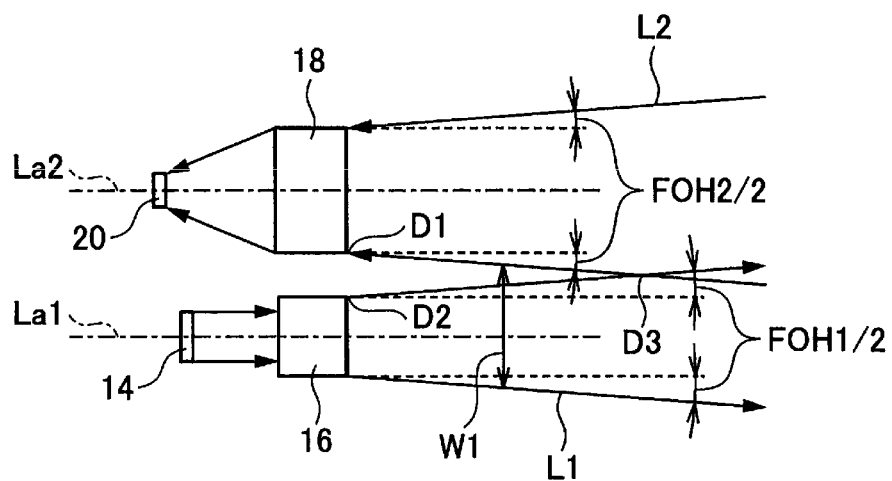
FIG. 3A is a top view of an irradiation optical system and a light reception optical system.
Figure 3B:
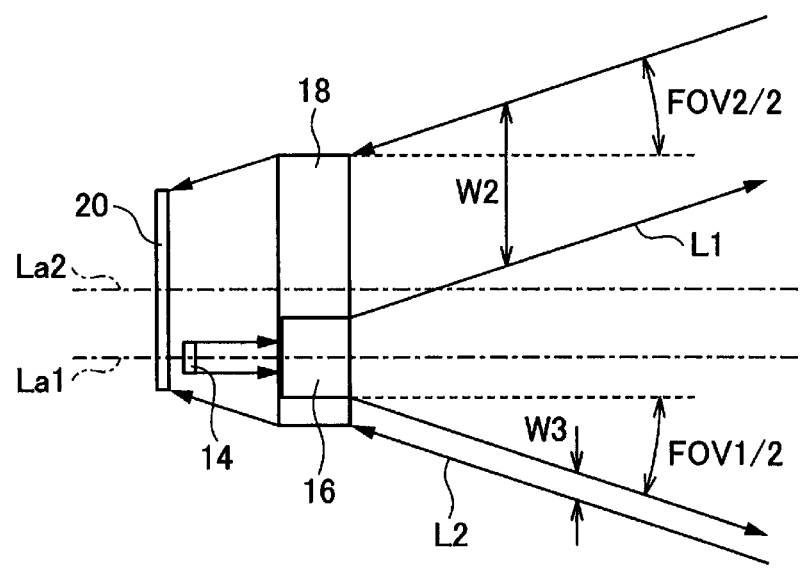
FIG. 3B is a side view thereof.
Figure 3C:
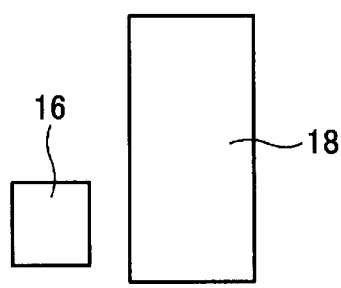
FIG. 3C is a front view thereof.
Figure 3D:
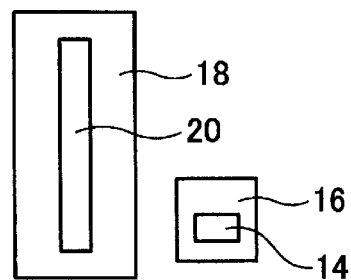
FIG. 3D is a rear view thereof.

First, an example in which the irradiation optical system 16 and the light reception optical system 18 are arranged side by side in the horizontal direction will be described based on FIGS. 3A to 3D. FIG. 3A is a top view, FIG. 3B is a side view, FIG. 3C is a front view, and FIG. 3D is a rear view of the irradiation optical system 16 and the light reception optical system 18. The example will be described in a case where the optical axis La1 and the optical axis La2 are parallel to each other.

First, the angles of view FOH1 and FOH2 in the horizontal direction will be described. As illustrated in FIG. 3A, the angle of view FOH1/2 of the irradiation optical system 16 is equal to the angle of view FOH2/2 of the light reception optical system 18. The width W1 between a side of the irradiation range L1 and the same side of the light reception range L2 in the horizontal direction is maintained at a constant value regardless of the distance to the measured object 2. The width W1 is approximately 0.03 m.

Next, the angle of view FOV1 in the vertical direction of the irradiation optical system 16 will be described. As illustrated in FIG. 3B, the angle of view FOV1/2 in the vertical direction of the irradiation optical system 16 is equal to the angle of view FOV2/2 in the vertical direction of the light reception optical system 18. That is, the irradiation range L1 seen sidewise exists within the light reception range L2. The width W2 is approximately 0.025 m, and the width W3 is approximately 0.005 m.

One example of the horizontal angles of view FOH1 and FOH2 and the angles of view FOV1 and FOV2 will be described. For example, the spread width in the horizontal direction of the laser light at a position at 30 m away from the irradiation optical system 16 is approximately 0.1 m, and an angle of view FOH along the horizontal direction of the irradiation optical system 16 is, less the width of 0.01 m in the horizontal direction of the irradiation surface of the irradiation optical system 16, (0.1−0.01)/30 m and is approximately 0.003 rad. For example, a spread width in the vertical direction of the laser light in the position at 30 m away is approximately 3 m, and since a width in the vertical direction of the irradiation surface of the irradiation optical system 16 can be ignored, the angles of view FOV1 and FOV2 are acquired by dividing 3 m by 30 m and are approximately 0.1 rad. Thus, in a proportion of the overlap between the irradiation range L1 and the light reception range L2, the proportion of the overlap in the horizontal direction is dominant. That is, the proportion of the overlap between the irradiation range L1 and the light reception range L2 in the horizontal direction in the position at 30 m away is, since the width W1 is approximately 0.03 m, acquired by dividing (0.1−0.03) by 0.1 and is approximately 70%.

Accordingly, since the widths W1, W2, and W3 are maintained at constant values regardless of the distance to the measured object 2, the proportion of the overlap between the irradiation range L1 and the light reception range L2 can be increased by increasing the distance to the measured object 2.

In the distance measuring device 1 according to the present embodiment, light that is received on a light reception surface of the light reception optical system 18 from the measured object 2 within the light reception range L2 reaches the sensor 20. Meanwhile, light that is received on the light reception surface from the measured object 2 outside of the light reception range L2 is absorbed by a black wall or the like in a lens tube containing the light reception optical system 18 and does not reach the sensor 20. That is, distance information as to the measured object 2 in a region where the irradiation range L1 and the light reception range L2 do not have an overlap cannot be acquired. For example, a triangular region denoted by D1, D2, and D3 illustrates the region where the irradiation range L1 and the light reception range L2 do not have an overlap. Thus, distance information to the measured object 2 in a region on an irradiation optical system side of a plane that is orthogonal to the optical axis La1 and passes the point D3 cannot be acquired.

Next, an example in which the irradiation optical system 16 and the light reception optical system 18 are arranged in the vertical direction will be described based on FIGS. 4A to 4D. The example will be described in a case where the optical axis La1 and the optical axis La2 are parallel to each other and are orthogonal to the rotation axis 4.

Figure 4A:
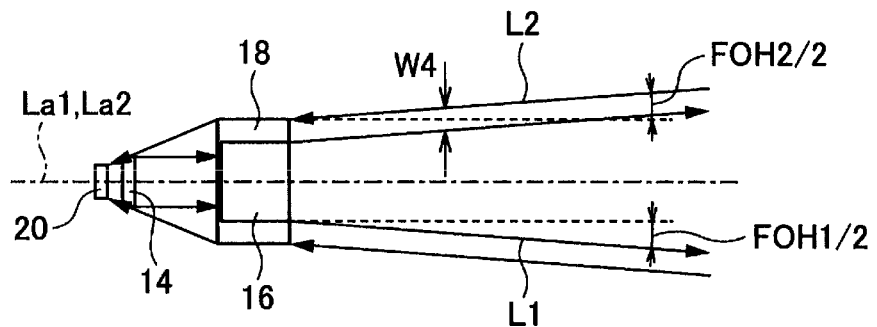
FIG. 4A is a top view of the irradiation optical system and the light reception optical system in an example in which the irradiation optical system and the light reception optical system are arranged in a vertical direction.
Figure 4B:
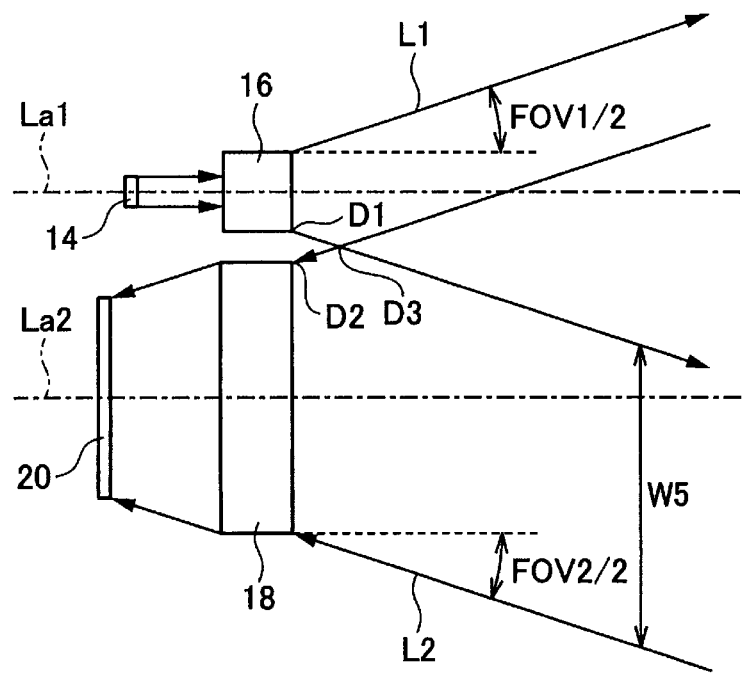
FIG. 4B is a side view thereof.
Figure 4C:
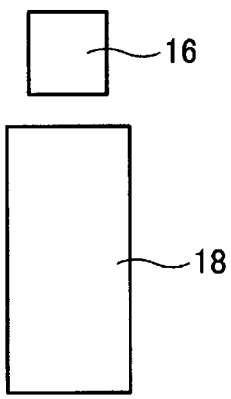
FIG. 4C is a front view thereof.
Figure 4D:
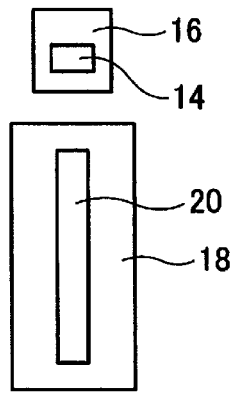
FIG. 4D is a rear view thereof.

FIG. 4A is a top view of an example in which the irradiation optical system 16 and the light reception optical system 18 are arranged one over the other in the vertical direction, FIG. 4B is a side view thereof, FIG. 4C is a front view thereof, and FIG. 4D is a rear view thereof.

First, the angles of view FOH1 and FOH2 in the horizontal direction will be described. As illustrated in FIG. 4A, the angle of view FOH1/2 in the horizontal direction of the irradiation optical system 16 is the spread of the laser light represented as an angle from the optical axis La1. In addition, the angle of view FOH2/2 in the horizontal direction of the light reception optical system 18 is the light reception range L2 represented as an angle from the optical axis La2. The angle of view FOH2/2 of the light reception optical system 18 is equal to the angle of view FOH1/2 of the irradiation optical system 16. In addition, since the optical axes La1 and La2 are parallel to each other, a width W4 between the end portion of the irradiation range L1 and the end portion of the light reception range L2 in the horizontal direction is maintained at a constant value regardless of the distance to the measured object 2. The horizontal angles of view FOH1 and FOH2 are equal to the horizontal angles of view FOH1 and FOH2 in the example of FIGS. 3A to 3D. FOH1 and FOH2 are (0.1−0.01)/30 m and are approximately 0.003 rad.

Next, the angle of view FOV1 in the vertical direction of the irradiation optical system 16 will be described. As illustrated in FIG. 4B, the angle of view FOV1/2 in the vertical direction of the irradiation optical system 16 is the spread of the laser light represented as an angle from the optical axis La1. In addition, the angle of view FOV2/2 in the vertical direction of the light reception optical system 18 is the light reception range L2 represented as an angle from the optical axis La2. The angle of view FOV2/2 of the light reception optical system 18 is configured to be equal to the angle of view FOV1/2 of the irradiation optical system 16. For example, the spread width in the vertical direction of the laser light in the position at 30 m away is approximately 3 m, and the angles of view FOV1 and FOV2 are, with the width of the irradiation surface ignored, acquired by dividing 3 m by 30 m and are approximately 0.1 rad.

A triangular region denoted by D1, D2, and D3 in FIG. 4B illustrates a region where the irradiation range L1 and the light reception range L2 do not have an overlap. As described above, the spread of the laser light in the vertical direction is greater than the spread thereof in the horizontal direction. Thus, the triangular region illustrated in FIGS. 4A to 4D is smaller than the triangular region illustrated in FIGS. 3A to 3D, and a distance range in which distance information as to the measured object 2 cannot be acquired is narrowed.

As illustrated in FIG. 4A, the irradiation range L1 seen from above exists within the light reception range L2. In addition, a width W5 between the side of the irradiation range L1 (the spread laser radiation) and the side of the light reception range L2 in the vertical direction is maintained at a constant value regardless of the distance to the measured object 2. For example, the spread width in the vertical direction of the laser light in the position at 30 m away is approximately 3 m, and the width W5 is approximately 0.03 m. Thus, the proportion of the overlap between the irradiation range L1 and the light reception range L2 in the vertical direction in the position at 30 m away is acquired by dividing (3−0.03) by 3 and is approximately 99%.

Accordingly, since the widths W4 and W5 are maintained at constant values regardless of the distance to the measured object 2, the proportion of the overlap between the irradiation range L1 of the irradiation optical system 16 and the light reception range L2 of the light reception optical system 18 can be increased by increasing the distance to the measured object 2.

Figure 5A:
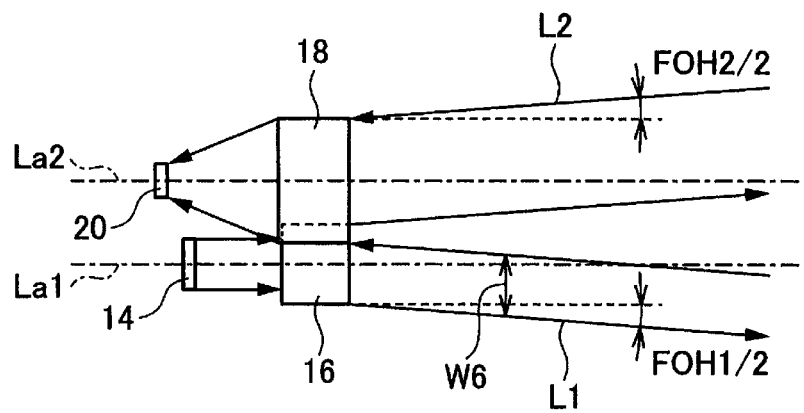
FIG. 5A is a top view of the irradiation optical system and the light reception optical system in an example of enabling measurement of a measured target at a near distance from the distance measuring device illustrated in FIGS. 4A to 4D.
Figure 5B:
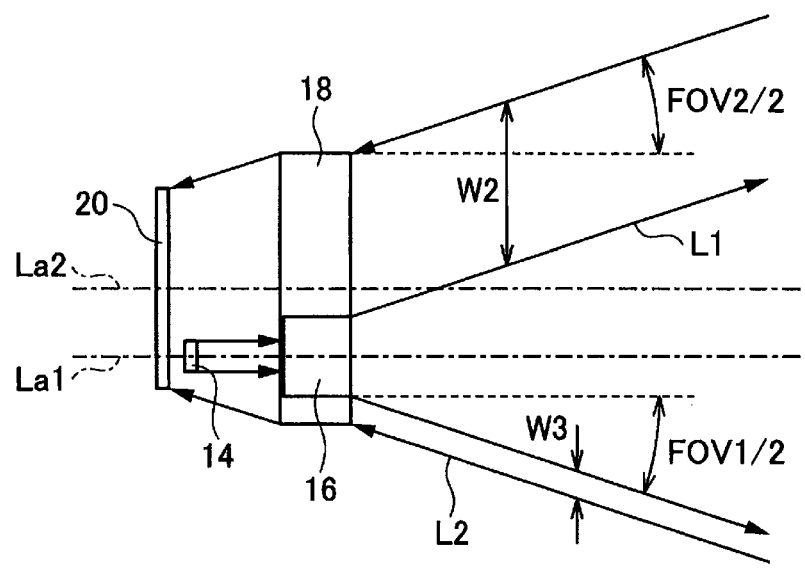
FIG. 5B is a side view thereof.
Figure 5C:
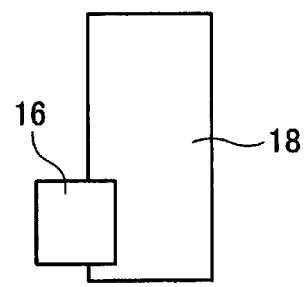
FIG. 5C is a front view thereof.
Figure 5D:
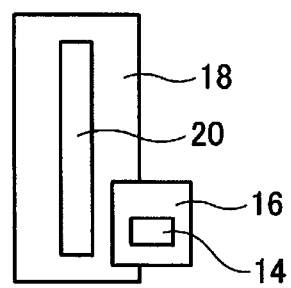
FIG. 5D is a rear view thereof.

Next, an example of arrangement of the irradiation optical system 16 and the light reception optical system 18 in which the proportion of the overlap between the irradiation range L1 and the light reception range L2 increases will be described based on FIGS. 5A to 5D. FIG. 5A is a top view of the irradiation optical system 16 and the light reception optical system 18 in an example of enabling measurement of a measured target at a near distance from the distance measuring device 1 illustrated in FIGS. 4A to 4D, FIG. 5B is a side view thereof, FIG. 5C is a front view thereof, and FIG. 5D is a rear view thereof. The example will be described in a case where the optical axis La1 and the optical axis La2 are parallel to each other.

First, the example of arrangement of the irradiation optical system 16 and the light reception optical system 18 will be described. At least a part of the irradiation surface of the irradiation optical system 16 is arranged within the light reception range L2 of the light reception optical system 18. That is, a part of the irradiation optical system 16 is arranged to be incorporated in the light reception optical system 18.

Next, the angles of view FOH1 and FOH2 in the horizontal direction will be described. As illustrated in FIG. 5A, the angle of view FOH1/2 of the irradiation optical system 16 is equal to the angle of view FOH2/2 of the light reception optical system 18. The angles of view FOH1/2 and FOH2/2 are equal to the angles of view FOH1/2 and FOH2/2 of the irradiation optical system 16 and the light reception optical system 18 illustrated in FIG. 3A.

A width W6 between the end portion of the irradiation range L1 and the end portion of the light reception range L2 in the horizontal direction is maintained at a constant value regardless of the distance to the measured object 2. For example, the spread width in the horizontal direction of the laser light in the position at 30 m away is set to approximately 0.1 m. Thus, the width W6 is approximately 0.01 m, and the overlap in the horizontal direction is acquired by dividing (0.1−0.01) by 0.1 and is 90%. That is, the proportion of the overlap is increased from 70% described with respect to FIGS. 3A to 3D to 90% by arranging at least a part of the irradiation surface of the irradiation optical system 16 within the light reception range L2 of the light reception optical system 18.

Since at least a part of the irradiation surface of the irradiation optical system 16 is arranged within the light reception range L2 of the light reception optical system 18, a triangular region as described above is not generated. Accordingly, measurement is enabled in the entire distance range allowed by measurement sensitivity of the sensor 20. That is, according to this arrangement, the measured object 2 at a nearer distance from the distance measuring device 1 than illustrated in FIGS. 3A to 3D and FIGS. 4A to 4D can be measured. At least a part of the irradiation surface of the irradiation optical system 16 blocks part of light received within the light reception range L2 of the sensor 20, and particularly an intensity of light that is received at the sensor 20 at a near distance is decreased. Accordingly, since the irradiation optical system 16 and the light reception optical system 18 in the horizontal the distance measuring device 1 illustrated in FIGS. 5A to 5D are arranged in a more horizontal direction than in the distance measuring device 1 illustrated in FIGS. 4A to 4D, a smaller height of the casing 10 (FIGS. 1A and 1B) can be configured. The distance measuring device 1 according to the present embodiment is used as being disposed on, for example, a roof of an automobile. Thus, a smaller height of the casing 10 (FIGS. 1A and 1B) does not hinder driving of a vehicle and is more practical.

Next, the angle of view FOV1 in the vertical direction of the irradiation optical system 16 will be described. As illustrated in FIG. 5B, the angle of view FOV1/2 of the irradiation optical system 16 is equal to the angle of view FOV2/2 of the light reception optical system 18. The angles of view FOV1/2 and FOV2/2 are equal to the angles of view FOV1/2 and FOV2/2 of the irradiation optical system 16 and the light reception optical system 18 illustrated in FIG. 3B. That is, the irradiation range L1 of the irradiation optical system 16 seen sidewise exists within the light reception range L2 of the light reception optical system 18.

Accordingly, the proportion of the overlap between the irradiation range L1 and the light reception range L2 can be increased by arranging at least a part of the irradiation surface of the irradiation optical system 16 within the light reception range L2 of the light reception optical system 18. At least a part of the irradiation surface of the irradiation optical system 16 may be arranged within the light reception range L2 of the light reception optical system 18 in a case where the irradiation optical system 16 and the light reception optical system 18 are arranged in the vertical direction as illustrated in FIGS. 4A to 4D. In this case as well, the proportion of the overlap between the irradiation range L1 and the light reception range L2 can be increased. In addition, the measured object 2 that is arranged at a nearer distance can be measured.

As described heretofore, in the distance measuring device 1 according to the present embodiment, the irradiation optical system 16 irradiates the measured object 2 with laser light by spreading the laser light in the first direction, and reflected light is received at the sensor 20 through the light reception optical system 18 having the optical axis La2 different from the optical axis La1 of the irradiation optical system 16. Accordingly, distances to a plurality of points can be measured at once.

Modification Example

While the sensor 20 illustrated in FIGS. 5A to 5D is configured with one one-dimensional sensor, the sensor 20 in a modification example is configured with two one-dimensional sensors. Hereinafter, a different part from the distance measuring device 1 illustrated in FIGS. 5A to 5D will be described.

Figure 6:
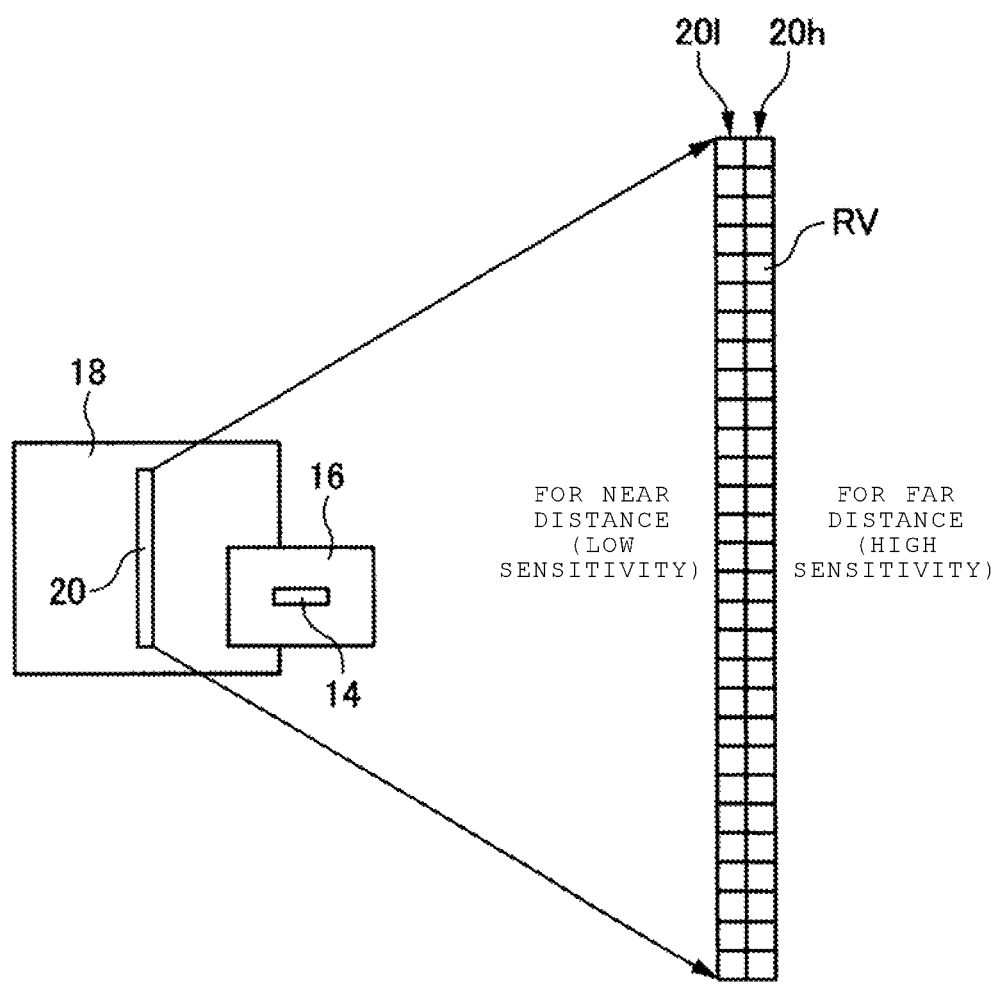
FIG. 6 is a diagram illustrating a schematic configuration of a sensor according to a modification example.

FIG. 6 is a diagram illustrating a schematic configuration of the sensor 20 according to the modification example. The sensor 20 is configured with two one-dimensional sensors, each having a line of individual sensors that are arranged parallel to the rotation axis 4.

As the distance to the measured object 2 is increased, reflected light is more condensed near the optical axis La2, and the intensity of the reflected laser light is decreased. Thus, sensitivity of one one-dimensional sensor 20h that is arranged nearer the optical axis La2 is configured to be higher than sensitivity of another one-dimensional sensor 20l. The high-sensitivity sensor 20h is suitable for far distance measurement, and the low-sensitivity sensor 20l is suitable for near distance measurement.

As described heretofore, according to the distance measuring device 1 according to the modification example, the sensor 20 is configured with two one-dimensional sensors, and each include a line of individual sensors that are arranged parallel to the rotation axis 4 and have different levels of sensitivity. Accordingly, saturation of electric signals in near distance measurement can be reduced, and measurement sensitivity in far distance measurement can be increased.

Second Embodiment

While the first embodiment is configured in such a manner that irradiation with laser light is performed in directions of 360 degrees around the rotation axis 4, a second embodiment is configured to have a reflective mirror 26 that reflects laser light. Hereinafter, a different part from the first embodiment will be described.

Figure 7:
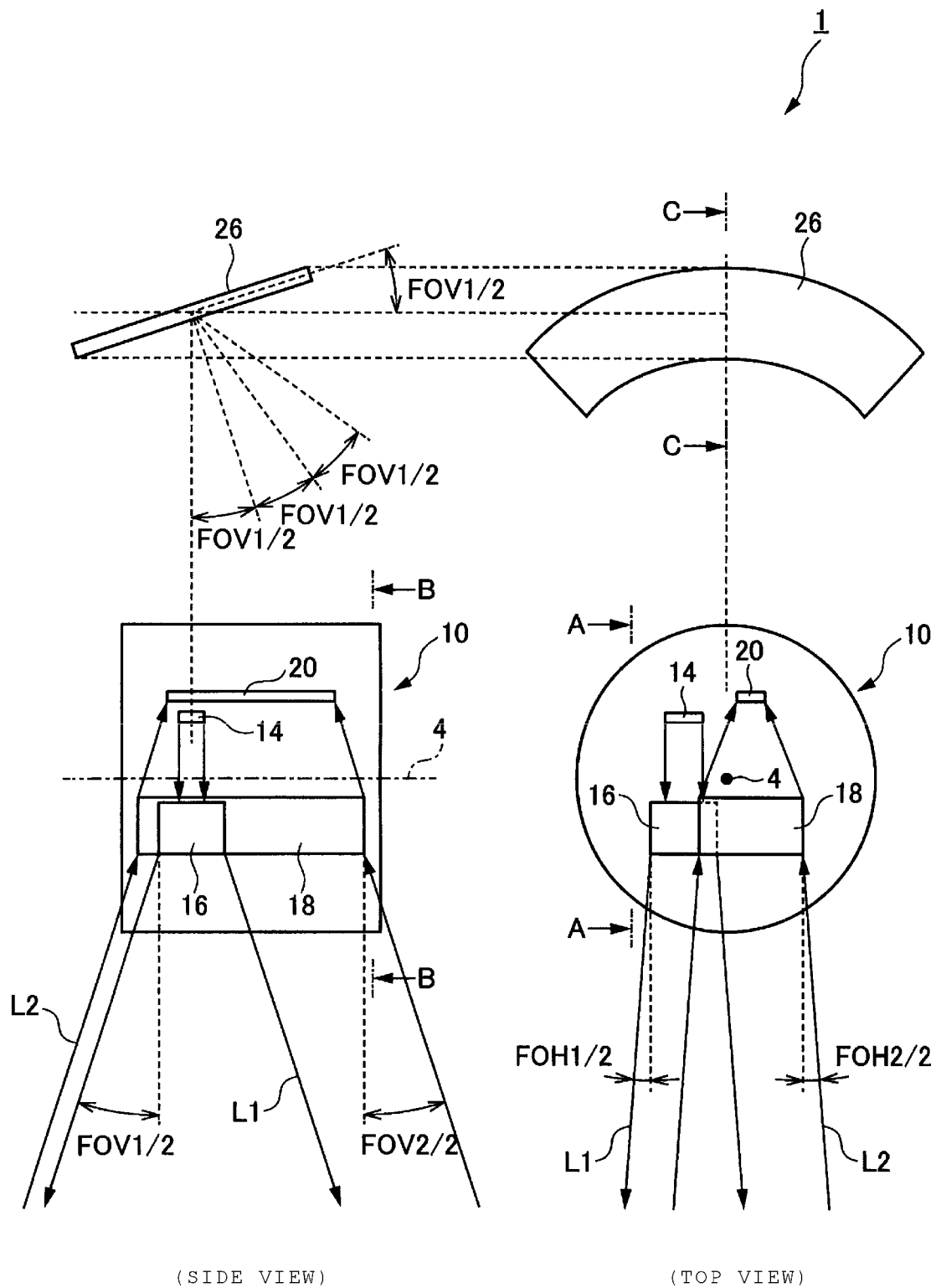
FIG. 7 is a diagram illustrating a schematic configuration of a distance measuring device according to a second embodiment.

FIG. 7 a diagram illustrating a schematic configuration of the distance measuring device 1 according to the second embodiment. A right side of the figures shows a top view of the device 1. A left side of the figures shows a side view of cross-section cut with an A-A line and a C-C line in the right side of the figure. A case of arranging at least a part of the irradiation surface of the irradiation optical system 16 within the light reception range L2 of the light reception optical system 18 will be described. In addition, the measurement processing unit 24 is arranged outside of the casing 10 and is not illustrated. Furthermore, the distance measuring device 1 according to the second embodiment provides a reflective mirror 26.

The same configurations as the first embodiment will be designated by the same reference signs and will not be described.

The reflective mirror 26 is configured to have a curved concentric shape with respect to the rotation axis 4. In addition, the side view of cross-section cut with the C-C line is a section of parallel planes that intersect with the rotation axis 4. That is, the reflection surface of the reflective mirror 26 is inclined at an angle of FOV1/2 from a direction parallel to the rotation axis 4. Accordingly, the reflective mirror 26 reflects the laser light from the irradiation optical system 16 vertically upward at an angle of FOV1/2. The reflective mirror 26 reflects the irradiated laser light from the irradiation optical system 16 in a case where the irradiation optical system 16 is rotated to a predetermined position. That is, distance information that is measured with the laser light reflected at the reflective mirror 26 is generated from distance information in a direction that is offset vertically upward at FOV1/2, compared with a case where the laser light is not reflected by the reflective mirror 26.

As described heretofore, in the distance measuring device 1 according to the present embodiment, the reflective mirror 26 reflects irradiated light from the irradiation optical system 16 in a vertically upward direction. Accordingly, a distance image having a wider angle than a distance image acquired without the reflective mirror 26 can be acquired.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A distance measuring device, comprising:
   a laser light source configured to emit laser light;
   an irradiation optical system configured to receive laser light from the laser light source and direct the laser light towards an object, the distance to which is to be measured, along a first optical axis, the irradiation optical system comprising a beam spreader configured to spread the laser light in a first direction crossing the first optical axis;
   a light reception optical system having a second optical axis that is different from the first optical axis, the light reception optical system positioned to receive laser light reflected from the object;
   a sensor comprising a plurality of light receiving elements arranged in a first sensor row paralleling the first direction and a second sensor row, which is parallel and adjacent to the first sensor row, the first sensor row comprising light receiving elements of a first sensitivity arranged adjacently along the first direction, the second sensor row comprising light receiving elements of a second sensitivity, different from the first sensitivity, arranged adjacently along the first direction, the sensor positioned to receive the light that has passed through the light reception optical system then reflected off the object; and
   a distance measuring unit configured to acquire distance information for the object based on the difference in time between emission of the laser light source and the reception of the reflected light from the object at different light receiving elements of the plurality of light receiving elements.

2. The distance measuring device according to claim 1, further comprising:
   a rotation unit that rotates the laser light source, the irradiation optical system, the sensor, and the light reception optical system about a rotation axis which is parallel to the first direction.

3. The distance measuring device according to claim 2, wherein at least a part of an irradiation surface of the irradiation optical system is disposed within a light reception range of the light reception optical system from the object.

4. The distance measuring device according to claim 2, wherein the optical axis of the irradiation optical system and the optical axis of the light reception optical system are parallel to each other, and each of the optical axes intersects with the rotation axis.

5. The distance measuring device according to claim 2, wherein the optical axis of the irradiation optical system and the optical axis of the light reception optical system are parallel to each other and are spaced from one another in a direction that is perpendicular to the rotation axis.

6. The distance measuring device of claim 2, further comprising a mirror comprising a reflecting surface, the reflecting surface inclined at an angle to the rotation axis.

7. A distance measuring device for measuring the distance to an object, comprising:
   a light beam emitter configured to emit a beam of light;
   a beam spreader configured to direct the beam of light along a first optical axis towards a distant object and spread the beam outwardly in a first direction away from the first optical axis, wherein a width of the beam in the first direction increases as distance from the beam spreader increases; and
   a light detector having a second optical axis, the first and second optical axes being parallel to each other, but not coaxial to each other, wherein
   the light detector comprises a first sensor row paralleling the first direction and a second sensor row parallel to the first sensor row, the first sensor row comprising light detection elements of a first sensitivity arranged adjacently along the first direction, the second sensor row comprising light detection elements of a second sensitivity, different from the first sensitivity, arranged adjacently along the first direction.

8. The distance measuring device according to claim 7, wherein light beam emitter, the beam spreader, and the light detector are inside a housing, and the housing is rotatable about a rotation axis.

9. The distance measuring device according to claim 8, wherein the first and second optical axes are orthogonal to the axis of rotation.

10. The distance measuring device according to claim 8, wherein the first and second optical axes intersect the axis of rotation.

* * * * *